(12) United States Patent
Leggatt

(10) Patent No.: US 7,467,810 B2
(45) Date of Patent: Dec. 23, 2008

(54) APPARATUS FOR TRANSPORTING A SENSOR

(75) Inventor: Charles David Leggatt, Toronto (CA)

(73) Assignee: Sensors & Software Inc., Mississauga (CA)

( * ) Notice: Subject to any disclaimer, the term of this patent is extended or adjusted under 35 U.S.C. 154(b) by 494 days.

(21) Appl. No.: 11/175,302

(22) Filed: Jul. 7, 2005

(65) Prior Publication Data
US 2006/0006620 A1   Jan. 12, 2006

Related U.S. Application Data

(60) Provisional application No. 60/590,925, filed on Jul. 26, 2004.

(30) Foreign Application Priority Data

Jul. 7, 2004 (CA) .................................. 2473292
Jul. 8, 2004 (CA) .................................. 2473266

(51) Int. Cl.
   *B62D 63/00* (2006.01)
(52) U.S. Cl. .................. 280/789; 414/917; 414/679
(58) Field of Classification Search .............. 280/789; 414/917, 679
   See application file for complete search history.

(56) References Cited

U.S. PATENT DOCUMENTS

| 4,054,007 | A |   | 10/1977 | Moore |
| 4,187,914 | A |   | 2/1980  | van der Lely |
| 4,245,191 | A |   | 1/1981  | Schroeder |
| 4,525,988 | A |   | 7/1985  | Harlan |
| 4,660,711 | A | * | 4/1987  | Alonso et al. ............... 198/430 |
| 5,332,998 | A |   | 7/1994  | Avignon et al. |
| 5,712,441 | A | * | 1/1998  | Grunewald ................. 89/1.13 |
| 5,767,679 | A |   | 6/1998  | Schroder |
| 5,970,690 | A |   | 10/1999 | Toman |
| 6,026,135 | A | * | 2/2000  | McFee et al. ............... 376/159 |
| 6,154,167 | A |   | 11/2000 | Annan et al. |
| 6,404,189 | B2 |  | 6/2002  | Kwun et al. |
| 6,445,334 | B1 |  | 9/2002  | Bradley et al. |
| 6,501,413 | B2 |  | 12/2002 | Annan et al. |
| 6,522,285 | B2 |  | 2/2003  | Stolarczyk et al. |
| 6,577,978 | B1 |  | 6/2003  | Annan et al. |
| 6,688,167 | B2 |  | 2/2004  | Ducros |
| 6,838,671 | B2 | * | 1/2005  | Compana et al. ............ 250/349 |
| 2005/0192752 | A1 | * | 9/2005 | Rooney et al. ................. 702/5 |
| 2006/0130593 | A1 | * | 6/2006 | Richards et al. ............... 73/856 |

OTHER PUBLICATIONS

Sensors & Software Inc., "EKKO Update", Apr. 2004, pp. 1-4.
Sensors & Software Inc., "Noggin", undated, pp. 1-6.

* cited by examiner

*Primary Examiner*—Paul N. Dickson
*Assistant Examiner*—Drew J. Brown

(57) ABSTRACT

An apparatus for transporting a sensor having a sensing surface at an operational distance from a target surface is disclosed. The apparatus includes an upper frame and spaced apart parallel front and rear struts. The upper ends of the struts are connected to the upper frame. The lower ends of the struts are connected to the sensor. The front and rear struts pivot about the upper frame to move the sensor in response to an obstacle on the target surface, The sensor pivots about the lower ends of the front and rear struts to maintain the sensing surface in substantially parallel orientation to the target surface. The angle between the sensing surface and the front and rear struts is less than 90°.

19 Claims, 10 Drawing Sheets

SECTION A-A
SCALE 1/10

SECTION D-D
WOOD BOX ABOVE TRAILER
SCALE 0.08 : 1

SECTION C-C
WOOD BOX BELOW TRAILER
SCALE 0.08 : 1

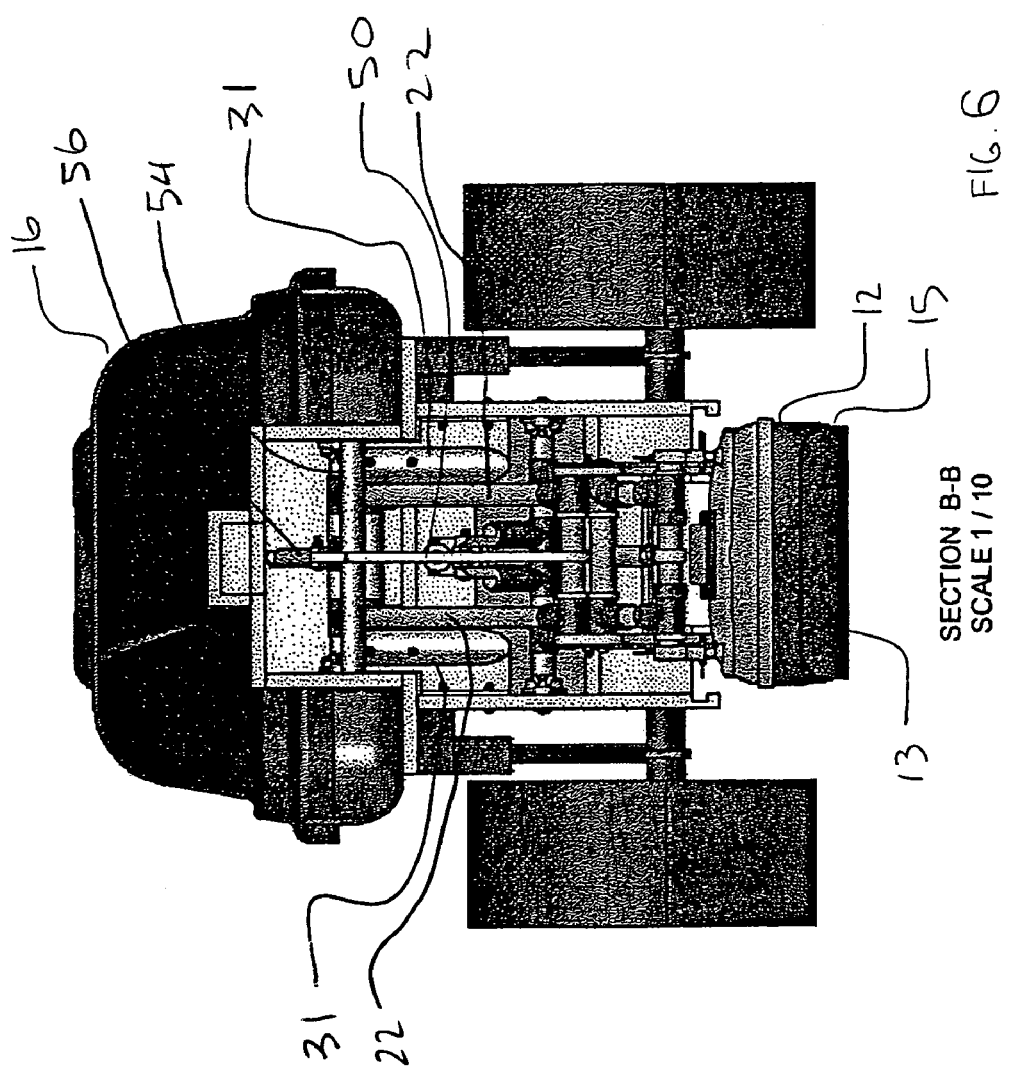

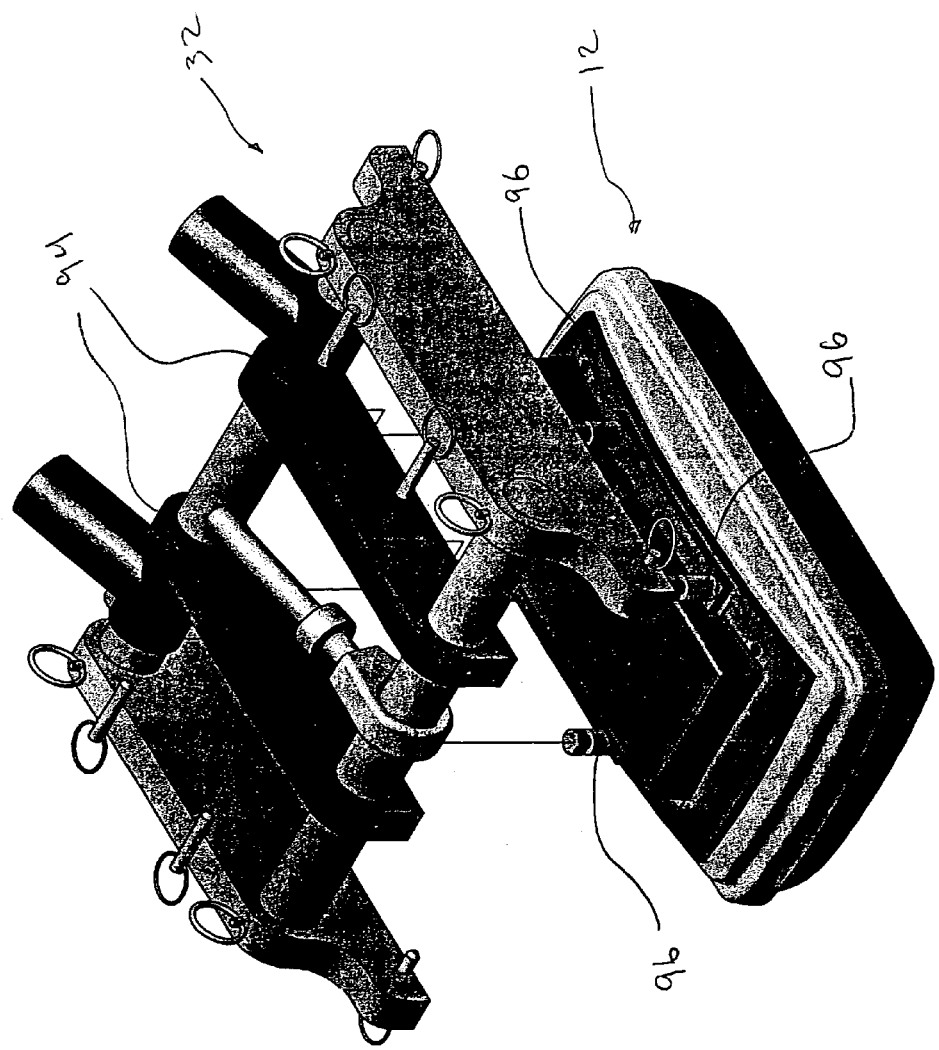

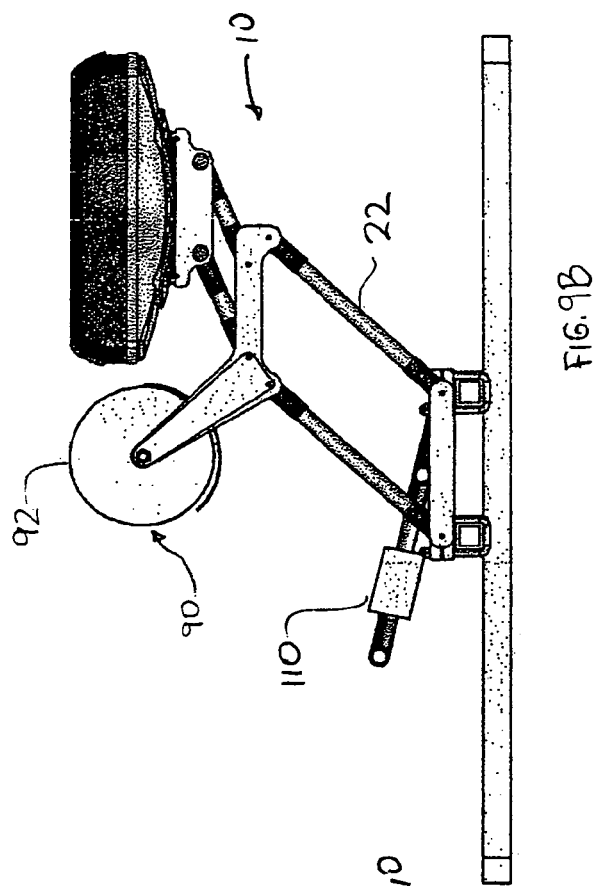
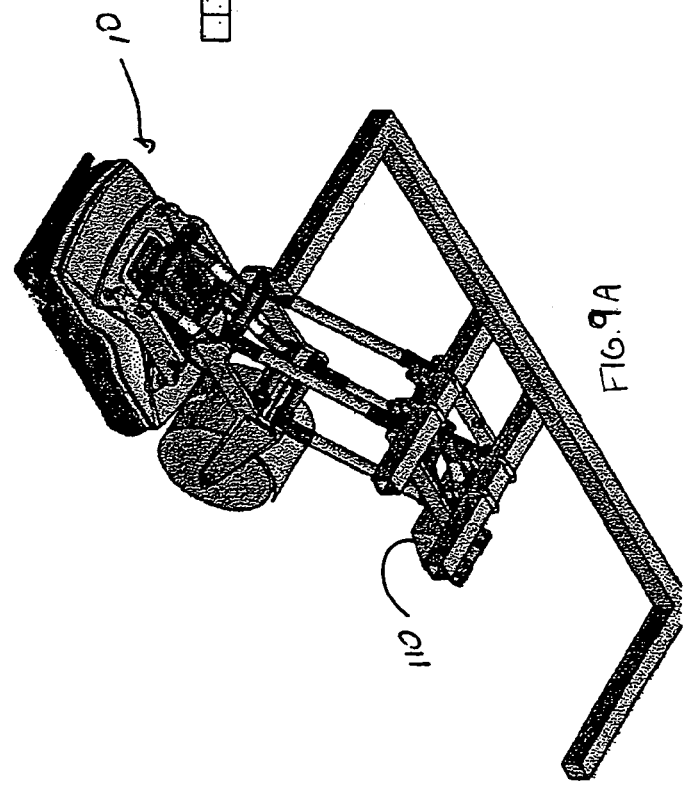

APPARATUS FOR TRANSPORTING A SENSOR

This is an application claiming the benefit under 35 USC 119(e) of U.S. Application Ser. No. 60/590,925 filed Jul. 26, 2004. U.S. Application Ser. No. 60/590,925; Canadian Application Serial No. 2,473,266 filed Jul. 8, 2004; and, Canadian Application Serial No. 2,473,292 filed Jul. 7, 2004 are incorporated herein, in their entirety, by this reference to them.

FIELD OF THE INVENTION

The invention relates to sensors, including without limitation sensors for subsurface imaging. In particular, the invention relates to an apparatus for transporting a sensor and positioning the sensor during travel over a target area.

BACKGROUND OF THE INVENTION

Subsurface imaging is widely used in many fields, such as archeology, forensic sciences, geotechnical and environmental engineering, and construction. Subsurface imaging is conducted using any number of known imaging technologies. One such technology is ground penetrating radar (GPR).

When GPR is used, the imaging is accomplished by positioning and moving a sensor, such as a GPR transmitter/receiver antenna assembly, on a path over a target surface. The target surface may be ground or road surface, or the wall or ceiling of a tunnel, cave, or the like. In order to obtain accurate data, it is desirable to maintain the sensor at a fixed operational distance from the target surface. This operational distance is usually quite close (e.g. within several centimeters) to the target surface. Accordingly, it is also desirable to protect the sensor from colliding with obstacles, debris, or other irregularities on the target surface.

One known solution for the above problems is a four-wheeled cart which is pushed by the operator along the target surface. The sensor is suspended from the cart behind the front wheels at the operational distance from the ground. The sensor is suspended from the cart by four pivoting struts located at each corner of the sensor. The struts are free to pivot about their connection points to the cart. The struts permit the sensor to swing out of the way when the sensor impacts an obstacle or when the grade of the target surface changes.

However, the cart described above is not suitable for all subsurface imaging applications. For example, the cart is not suitable for applications which require the sensor to travel long distances or at high speeds, such as when the sensor is towed behind motorized vehicles.

Accordingly, there is a need for an improved apparatus for transporting a sensor, which is suitable for travel over long distances or at high speeds.

SUMMARY OF THE INVENTION

It is an object of the present invention to provide an improvement over the prior art. It is a further object of the present invention to provide an apparatus for transporting a sensor which is capable of being deployed at high speeds and long distances. It is a further object of the invention to provide an apparatus for transporting a sensor which is capable of improved obstacle avoidance and cushioning sensor movement without unduly removing the sensor outside the operational distance. This advantage is particularly desirable when the sensor is transported at high speed, where a collision with an obstacle on the target surface or constant jarring may damage the sensor.

It is a further object of the invention to provide faster and simpler adjustability of the sensing surface to different operational distances. This advantage may be provided by maintaining the angle between the sensing surface and the struts at less than 90°, thereby limiting the sensor's downward movement.

According to a first aspect of the invention, an apparatus for transporting a sensor having a sensing surface at an operational distance from a target surface is provided. The apparatus comprises: a) an upper frame; b) a front strut defining an upper end and a lower end, the upper end of the front strut being pivotally connected to the upper frame, the lower end of the front strut being pivotally connected to the sensor; and c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor. The front and rear struts are adapted to pivot about the upper frame to move the sensor in response to an obstacle on the target surface, The sensor is adapted to pivot about the lower ends of the front and rear struts to maintain the sensing surface in substantially parallel orientation to the target surface. The angle between the sensing surface and each of the front strut and rear strut is less than 90°.

According to a second aspect of the invention, an apparatus for transporting a sensor having a sensing surface at an operational distance from a target surface is provided. The apparatus comprises: a) an upper frame; b) a front strut defining an upper end and a lower end, the upper end of the front strut being pivotally connected to the upper frame, the lower end of the front strut being pivotally connected to the sensor; c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor; and d) a deflector connected to one of the front strut, the rear strut, and the sensor. The deflector is located forward of the sensor and spaced apart therefrom. The deflector defines a deflection surface. Upon the deflection surface impacting the obstacle on the target surface, the deflector is adapted to pivot the struts upwardly, thereby avoiding collision of the sensing surface with the obstacle.

According to a third aspect of the invention, an apparatus for transporting a sensor having a sensing surface at an operational distance from a target surface is provided. The apparatus comprises: a) an upper frame; b) a front strut defining an upper end and a lower end, the upper end of the front strut being pivotally connected to the upper frame, the lower end of the front strut being pivotally connected to the sensor; c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor; d) a lever operably connected to the upper frame, the lever being adapted to pivot the front and rear struts between a deployed position where the sensing surface is located at the operational distance from the target surface, and a stored position where the sensing surface is located at a stored distance, the stored distance being greater than the operational distance; and e) an actuator operably connected to the lever, the actuator adapted to move the lever between the deployed and stored positions.

According to a fourth aspect of the invention, an apparatus for transporting a sensor is provided. The apparatus comprises: a) an upper frame; b) a front strut defining an upper end and a lower end, the upper end of the front strut being pivotally connected to the upper frame, the lower end of the front strut being pivotally connected to the sensor; c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor; d) a cushioning bracket pivotally connected to the sensor at a bottom end thereof, the cushioning bracket defining a longitudinal guide slot therein, and e) a bar connected to the upper frame in transverse relation to the slot, the bar being slidingly secured within the slot. The cushioning bracket slides along the bar upon movement of the sensor.

BRIEF DESCRIPTION OF THE DRAWINGS

In the accompanying drawings:

FIG. 6 is a rear view of the preferred embodiment in the deployed position.

FIG. 7B is an exploded perspective view showing the mounting bracket of the preferred embodiment mated to a smaller sensor.

FIG. 9A is a perspective view of an alternative embodiment of a sensor transporting apparatus.

FIG. 9B is an elevation view of the apparatus of FIG. 9A.

DETAILED DESCRIPTION OF A PREFERRED EMBODIMENT OF THE INVENTION

Figure 1:
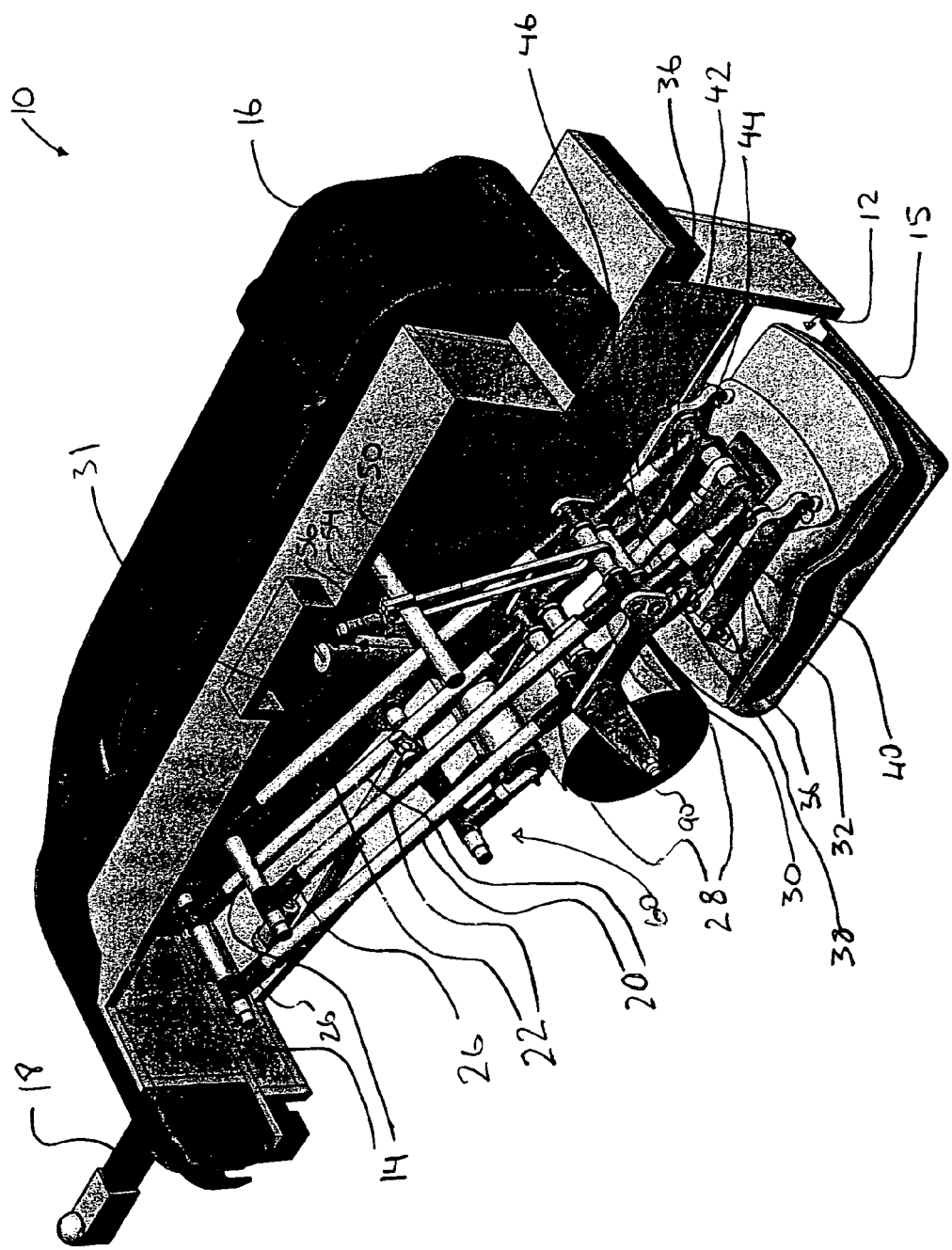
FIG. 1 is a cut-away perspective view showing a sensor transporting apparatus according to a preferred embodiment of the present invention.

FIGS. 1-6 show an apparatus 10 for transporting and stabilizing a sensor 12, according to a preferred embodiment of the present invention. The sensor 12 is preferably a conventional GPR radar sensor assembly. The sensor 12 includes a planar sensing surface 13 protected by a skid plate 15. When in a deployed position, the sensing surface 13 is positioned at an operational distance d (best shown in FIG. 3) from the target surface 17 (such as a ground or road surface, or a tunnel wall or ceiling) when deployed for imaging. The operational distance d is a function of GPR frequency and actual surface roughness, and may range from about 2 mm to about 20 cm. Typical settings are about 3-10 mm for high frequency sensors and about 10-20 mm for low frequency sensors. It will be understood by those skilled in the art that, for certain applications where the target surface 17 is extremely rough or a lower resolution scan is acceptable, the sensor may be located much higher from the target surface. Accordingly, the distance d may be much greater.

The apparatus 10 includes an upper frame 14 which is mounted to a trailer 16, which is towed behind a motorized vehicle (not shown), such as a car or truck. The upper frame 14 is connected to the walls of the trailer 16 by any suitable fasteners, such as screws 19. Preferably, holes (not shown) in the trailer walls which accept the screws 19 are large holes or slots to permit the adjustment of the orientation of the apparatus 10 in the trailer 16. The trailer 16 is connected to the rear of the motorized vehicle by a trailer tongue 18. It will be understood by those skilled in the art that the apparatus 10 may be mounted within the vehicle itself, and in such an embodiment, no trailer 16 is necessary.

As used herein, the terms "front", "forward", "rear", "back", and "backwards" are intended to refer to orientation in relation to the trailer tongue 18, which represents the primary direction of vehicle movement. The terms "top", "upper", "upward", "bottom", "lower", and "downward" are intended to refer to orientation in relation to the target surface 17.

Referring again to FIGS. 1-6, a pair of front struts 20 and a pair of rear struts 22, each having an upper end 26 and lower end 28, are provided. The upper ends 26 of the struts 20, 22 are pivotally mounted to the upper frame 14 in any suitable fashion, such as by conventional ball bearings 24. The lower ends 28 of the struts 20, 22 are pivotally mounted to a lower frame 30 in a similar fashion. Bushings 31 are connected to upper frame 14 on either side of rear struts 22 to stabilize the apparatus 10 against excessive side-to-side movement.

Figure 3:
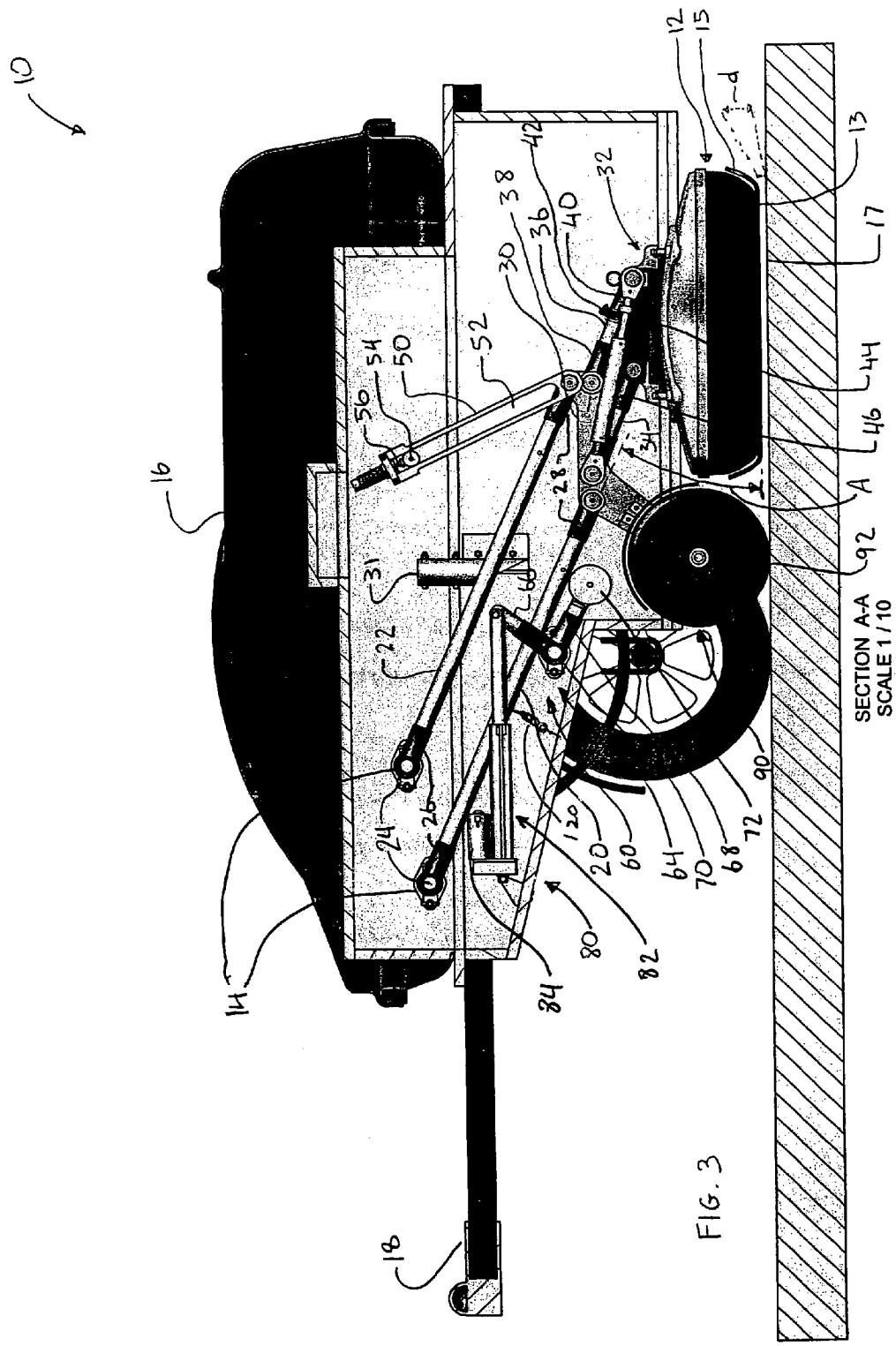
FIG. 3 is a side view of the preferred embodiment in the deployed position.
Figure 4:
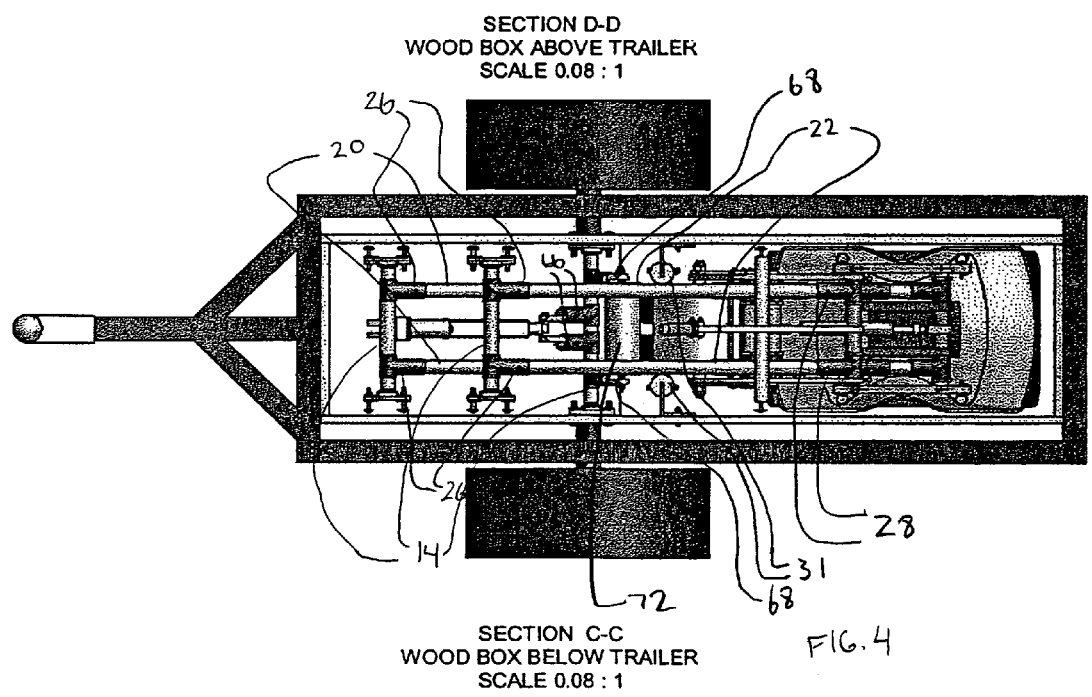
FIG. 4 is a top view of the preferred embodiment in the stored position.

Preferably, the front struts 20 and rear struts 22 are substantially parallel and have a substantially equal length, such that the pivotable connections of the front an rear struts 20, 22 to the upper frame 14 and lower frame 30 define four corners of a parallelogram. As shown in FIG. 3, the angle A between the struts 20, 22 and the sensing surface 13 varies between a deployed and stored positions (described in detail below), and is preferably less than 90°.

It will be understood by those skilled in the art that only one front strut 20 and one rear strut 22 may be provided, or more than two front and rear struts may be provided, and such variations are within the scope of the present invention.

The lower frame 30 is connected to a mounting bracket 32 by a pair of bottom front struts 34 and a pair of bottom rear struts 36. The bottom struts 34, 36 are pivotally connected in any suitable fashion to the lower frame 30 and mounting bracket 32 at their upper ends 38 and lower ends 40, respectively. The bottom struts 34, 36, the lower frame 30 and mounting bracket 32 also define a parallelogram which pivots about its corners. The sensor 12 is mounted to the bottom of the mounting bracket 32, as described in detail below.

A fine adjustment means, such as an adjustment screw assembly 42 is mounted to the lower frame 30 and mounting bracket 32. The adjustment screw assembly 42 includes a screw portion 44 pivotally connected the mounting bracket 32. The screw portion 44 is received within a threaded bolt portion 46. By turning the bolt portion 46, the adjustment screw assembly 42 changes the distance between the lower frame 30 and mounting bracket 32 to position the sensing surface 13 at the operational distance d when the apparatus 10 is in the deployed position. Preferably, the screw assembly 42 only sets a limit on downward (clockwise) pivoting of the bottom struts 34, 36, but permits upward (counterclockwise) pivoting.

Continuing to refer to FIGS. 1-6, a cushioning bracket 50 is pivotally connected the lower frame 30 at a bottom end thereof. An elongate guide slot 52 is defined in the cushioning bracket 50. A bar 54 is transversely received in the guide slot 52. A cushioning means, such as a conventional cushioning piston 56, is located in the upper end of the cushioning bracket 50. The cushioning piston 56 is commercially available under from Ace Controls International and utilizes compressed air to decelerate the bar 54. The rate of deceleration may be adjusted to match the weight of the sensor 12. The adjustment may be made using a conventional bleed valve (not shown) on the cushioning piston 56 which controls the rate at which air is evacuated when the bar 54 pushes against the cushioning piston 56. The cushioning piston 56 is biased toward the lower end of the cushioning bracket 50 by a conventional spring (not shown).

A lever 60 is provided to move the front and rear struts 20, 22 between deployed and stored positions. The lever is preferably an angled arm 64 which includes a pair of proximate portions 66 connected to a pair of distal portions 68 at an elbow 70. The elbow 70 is pivotally connected to the upper frame 14 to permit the arm 64 to pivot about the elbow 70. A roller 72 is rotatably connected to the distal portion 68 of the arm 64. Two parallel circumferential grooves (not shown) are provided in the roller 72. The front struts 22 rest in the grooves in the roller 72.

An actuator 80 is pivotally connected to the proximate portions 66 of the arm 64. The actuator 80 includes a conventional screw 82 which pushes and pulls on the arm 64 to rotate the arm 64 about the elbow 70. The screw 82 is driven by a conventional servomotor 84, which is controlled by a control system (not shown). The control system is capable of adjusting the position of the roller 72 in the deployed position by sending the appropriate instructions to the servomotor 84. In this manner, the control system is able to provide a coarse adjustment to position the sensing surface 13 at the operational distance d when in the deployed position.

Continuing to refer to FIGS. 1-6, a deflector wheel 90 is located forward of the sensor 12 and is mounted to the lower frame 30. The deflector wheel 90 has an outer deflection surface 92. In the deployed position, the deflector wheel 90 preferably rolls on the target surface 17 unless it impacts an obstacle (as explained below). In other words, when the apparatus 10 is in the deployed position, the distance between the sensing surface 13 and the deflection surface 92 is preferably the operational distance d.

One or more springs 120 may be connected between one or more of the struts 20, 22 and the trailer 16, or a part fixed in position relative to the trailer 16, to bias the sensor 12 towards the target surface 17 and so limit the height that the sensor 12 may bounce when the deflector wheel 90 hits a bump in the road.

Figure 7A:
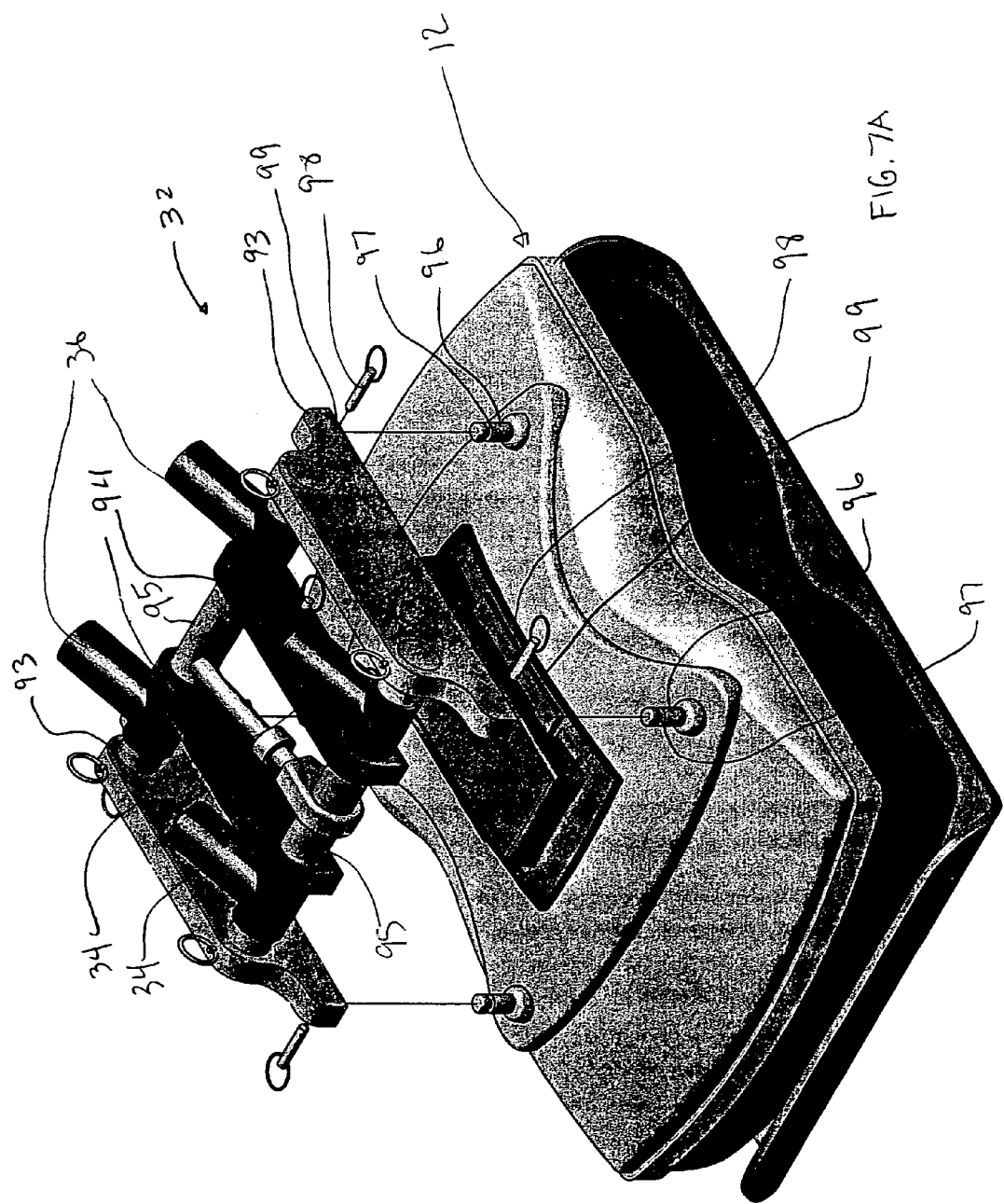
FIG. 7A is an exploded perspective view showing the mounting bracket of the preferred embodiment.

Referring now to FIG. 7A, the mounting bracket 32 includes a pair of outer rails 93 and a pair of inner rails 94. The rails 93, 94 are connected to each other and to bottom struts 34, 36 by cross members 95. As discussed above, the bottom struts 34, 36 pivot about the cross members 95. A pair of bores (not shown) is provided in each outer rail 93 and inner rail 94. In the sensor 12 shown in FIGS. 1-7A, four posts 96 are provided at each corner of the sensor. Each post 96 has a circumferential groove 97 machined therein. The sensor 12 can be securely connected to the mounting bracket 32 by locating the posts 96 in the corresponding bores of outer rails 93 and inserting pins 98 through transverse holes 99 of outer rails 93 such that pins 98 locate in corresponding grooves 97. Inner rails 94 also include transverse holes 99 to accommodate pins 98 for the reasons described below.

FIG. 7B shows the mounting bracket 32 connected to a smaller sensor 12. Due to the smaller size of the sensor 12, the posts 96 align with the bores in the inner rails 94 and are secured by pins 98 in the same manner as described in FIG. 7A above. In this manner, the mounting bracket 32 of the apparatus 10 may be easily connected to different sizes of sensors.

It will be understood by those skilled in the art the apparatus 10 may be used in many different configurations with one or more other identical apparatus 10, depending on the subsurface imaging requirements. For example, two or more apparatus 10 may be deployed within a single trailer 16 in a side-by-side row configuration. Alternatively, a plurality of apparatus 10 may be deployed in a matrix having one or more rows and columns of apparatus 10, such as 2-by-2, or 3-by-3.

Figure 8:
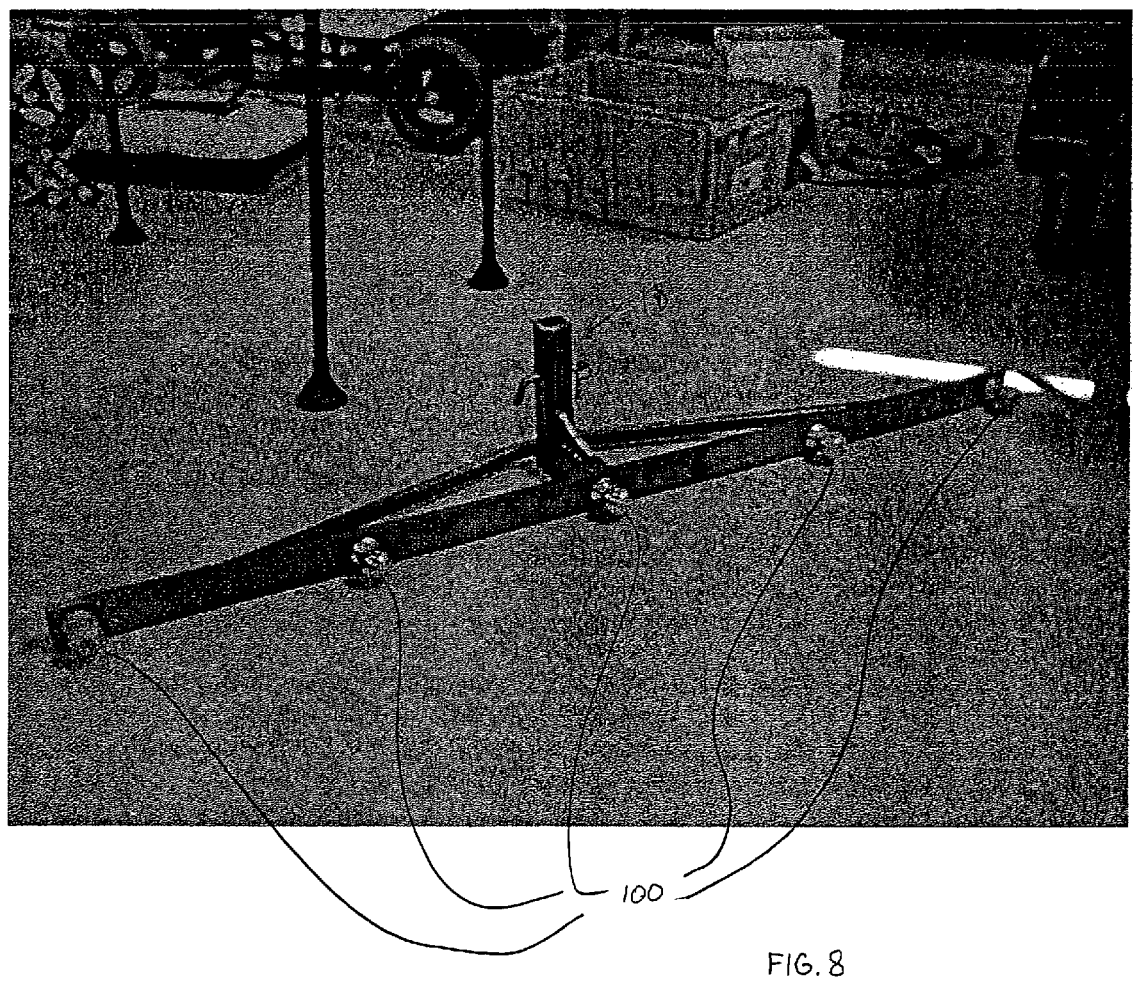
FIG. 8 is a photograph of a trailer hitch particularly suitable for an alternative embodiment of the present invention.

In a further alternative embodiment, several trailers 16 may be towed behind the motorized vehicle. Each trailer could be capable of deploying one or more apparatus 10 in the configurations described above. As shown in FIG. 8, a trailer hitch 18 having a plurality of balls 100 could be used for this purpose.

The operation of the apparatus 10 according to a preferred embodiment of the present invention will now be described.

Figure 2:
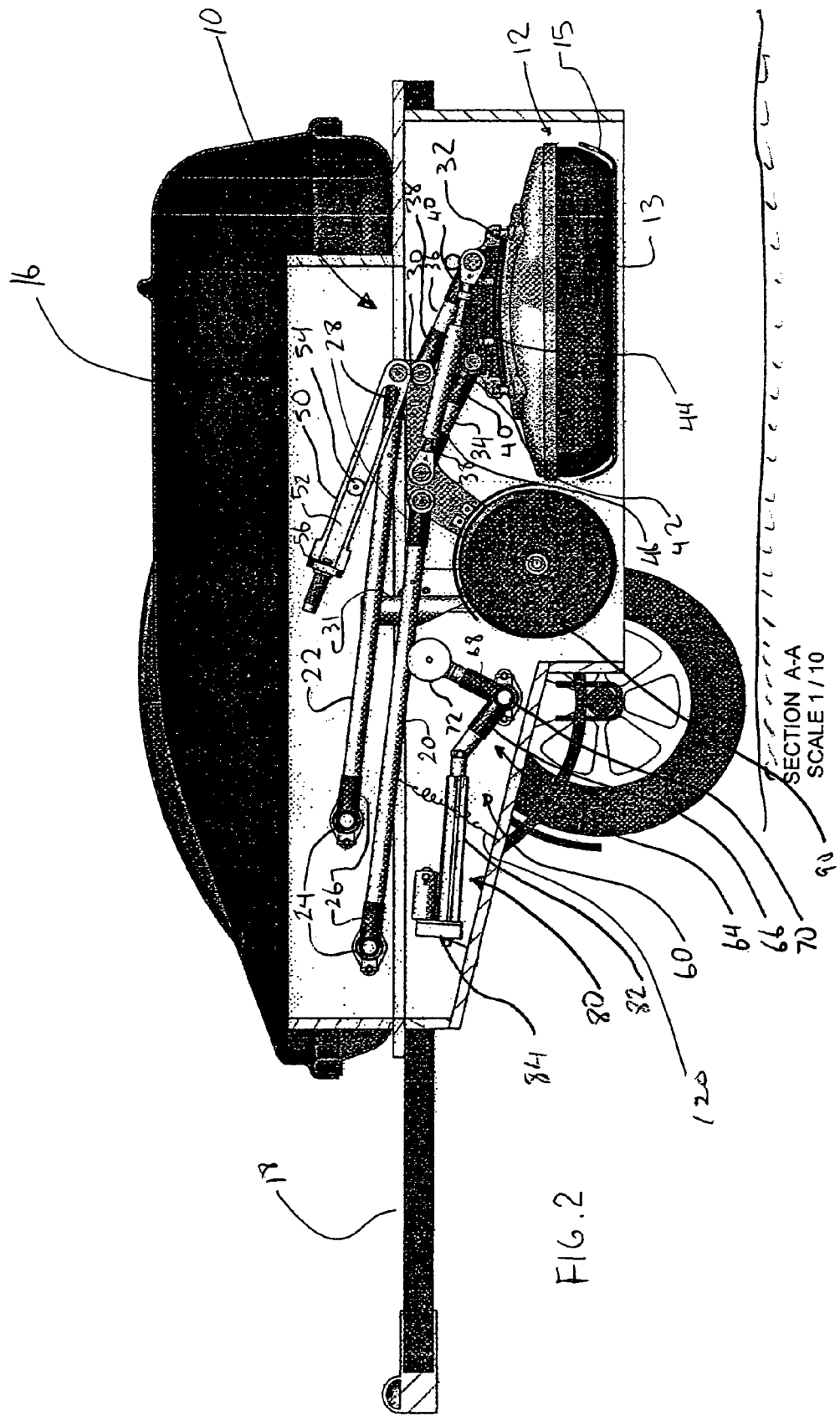
FIG. 2 is a side view of the preferred embodiment in a stored position.

Referring to FIGS. 1 and 2, the trailer 16 containing the apparatus 10 is towed to the target surface by the motorized vehicle (not shown). During transport, the apparatus 10 is in the stored position, where the distance between the sensing surface 13 and the surface is greater than the operational distance d. Preferably, the entire apparatus 10, including the sensing surface 13, is within the interior of the trailer 16 when in the stored position.

Figure 5:
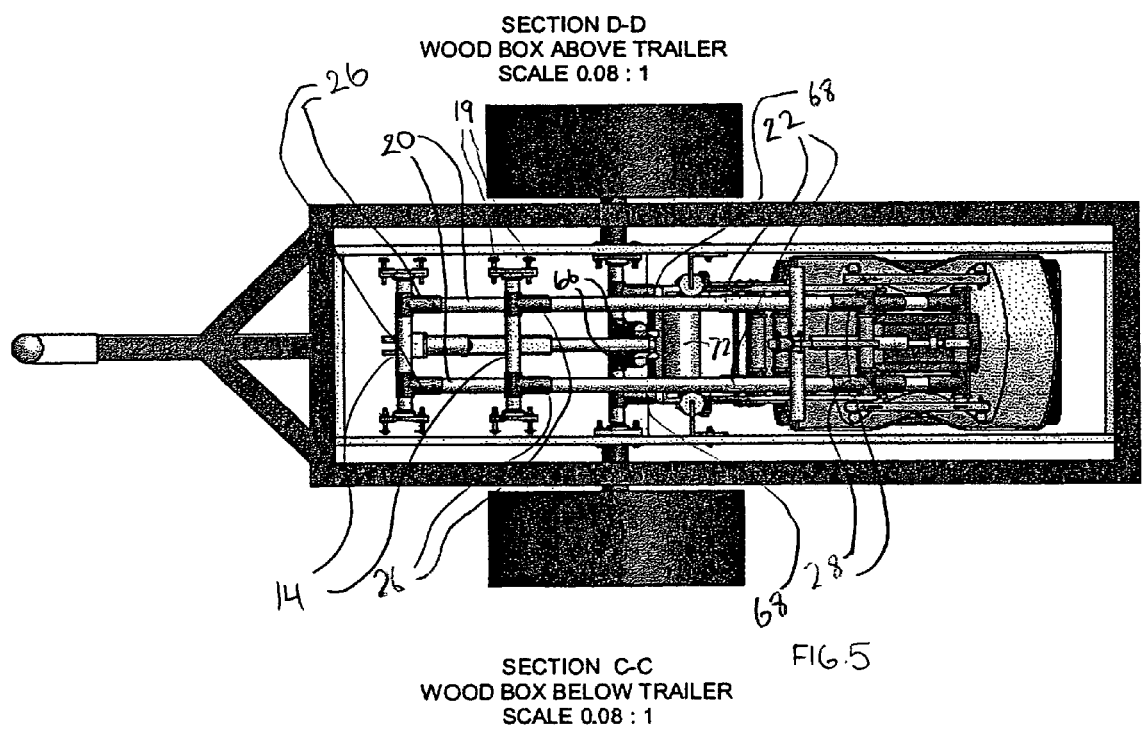
FIG. 5 is a top view of the preferred embodiment in the deployed position.

Referring now to FIGS. 3, 5, and 6, upon arrival to the target surface 17, the apparatus 10 is lowered into the deployed position. The control system (not shown) sends a command to the servo motor 84, which in turn drives the screw 82 to push on the proximate portions 66 of the arm 64. The arm 64 rotates clockwise about the elbow 70, causing the roller 72 connected to the distal portion 68 of the arm 64 to move downward into the deployed position.

The struts 20, 22 are free to pivot about the upper frame 14. Accordingly, the force of gravity causes the struts 20, 22 to pivot downward until the deflection surface 92 of deflector wheel 90 rests on the target surface 17. The screw assembly 42 may then be used to pivot the bottom struts 34, 36 upward (counterclockwise) to set the distance between the deflection surface 92 and the sensing surface 13 at the operational distance d. The sensing surface 13 is maintained in substantially parallel relation to the target surface 17 because the sensor 12 is free to pivot about the lower ends 40 of the bottom struts 34, 36.

Alternatively, the position of the roller 72 may be used to position the target surface 13. In this case, the deflector wheel 90 may not rest on the target surface 17, and consequently, the distance between the deflection surface 92 and sensing surface 13 may not be the operational distance d. Typically, the deflection surface 92 of the deflector wheel 90 would still be located at or below the sensing surface 13 in order to protect the sensor 12 from obstacles on the target surface 17.

It will be understood by those skilled in the art that the adjustments described above may be performed prior to transporting the apparatus 10 to the target surface 17, or at any other suitable time.

After the apparatus 10 is moved into the deployed position, it is transported along the target surface 17 for the subsurface imaging application. The deflector wheel 90 rolls on the target surface 17 in front of the sensor 12. If there is an obstacle or other irregularity in the path of the sensor 12, the obstacle impacts on the deflection surface 92 of the deflector wheel 90. The impact force on the deflector wheel 90 causes the lower frame 30 to pivot counterclockwise, thereby moving upward away from the target surface 17. The sensing surface 13 of the sensor 12 (also connected to the lower frame 30) also moves upwards by the same distance, thereby improving the likelihood that the obstacle will not impact any part of the sensor 12, such as the sensing surface 13. The movement of the lower frame 30 causes the struts 20, 22 to also pivot upward and counterclockwise. At the same time, the cushioning bracket 50 slides upward relative to the bar 54, causing the bar 54 to move away from the cushioning piston 56. The spring (not shown) causes the cushioning piston 56 to extend into the guide slot 52.

After a period of time, the force of gravity cause the struts 20, 22 to pivot downward clockwise back toward their original deployed position. At the same time, the cushioning bracket 50 slides down along the bar 54. At the end of its range of motion, the bar 54 impacts against the cushioning piston 56 which slows the pivoting movement of the struts 20, 22 to cushion the impact of the wheel 90 against the target surface 17. This, in turn, reduces the jarring of the sensor 12. The cushioning taking place only at the end of the range of motion of the cushioning bracket 50 strikes a balance between the desirability of protecting the sensor 12 and the desirability to maximize the time the sensing surface 13 is at the operational distance d (which is important for accuracy of the imaging).

In the event that an obstacle on the target surface 17 which somehow avoided the wheel 90 impacts on the sensing surface 13, further protection against damage from such impact is provided by the bottom struts 34, 36. Specifically, the impact of the obstacle on the skid plate 15 of the sensor 12 will cause the sensor 12 to move upward by pivoting the bottom struts 34, 36 counterclockwise, thereby improving the chances of avoiding further impact or damage. The bottom struts 34, 36 pivot back to their original position (operational distance d) set by the screw assembly 42. As discussed above, the screw assembly permits the bottom struts 34, 36 to pivot freely in the counterclockwise direction, and only prevents clockwise movement past a preset point corresponding to the operational distance d.

After the imaging application is completed, the apparatus 10 is moved into the stored position shown in FIG. 2. The control system (not shown) sends a command to the servo motor 84, which in turn drives the screw 82 to pull on the proximate portions 66 of the arm 64. The arm 64 rotates counterclockwise about the elbow 70, causing the roller 72 connected to the distal portions 68 of the arm 64 to move upward. The roller 72 pivots the struts 20, 22 counterclockwise into the stored position, causing the sensor 12 to move upward into the trailer 16.

FIGS. 9A and 9B show another alternative embodiment of the apparatus 10, which is particularly suitable for imaging of overhead surfaces, such as tunnel ceilings. Such an embodiment includes a counterweight 110 connected to rear strut 22. The counterweight 110 uses the force of gravity to urge the struts 20, 22 toward the target surface 17 until the deflection surface 92 of the deflector wheel 90 contacts the target surface 17. In all other respects, this embodiment is substantially identical to the preferred embodiment, and will not be further described.

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

The invention claimed is:

1. An apparatus for transporting a sensor having a sensing surface at an operational distance from a target surface, the apparatus comprising:
   a) an upper frame;
   b) a front strut defining an upper end and a lower end, the upper end of the front strut being pivotally connected to the upper frame, the lower end of the front strut being pivotally connected to the sensor;
   c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor; and
   d) a deflector connected to one of the front strut, the rear strut, or the sensor, the deflector being located forward of the sensor and spaced apart therefrom, the deflector defining a deflection surface;
   wherein the front and rear struts are adapted to pivot about the upper frame to move the sensor in response to an obstacle on the target surfaces;
   wherein the sensor is adapted to pivot about the lower ends of the front and rear struts to maintain the sensing surface in substantially parallel orientation to the target surface; and
   wherein, upon the deflection surface impacting the obstacle on the target surface, the deflector is adapted to pivot the struts upwardly.

2. The apparatus of claim 1 wherein the angle between the sensing surface and each of the front strut and rear strut is less than 90°.

3. The apparatus of claim 2, wherein the front and rear struts define opposing pivotable sides of a first parallelogram.

4. The apparatus of claim 1, further comprising:
   a) a bottom frame, wherein the lower ends of the front and rear struts are pivotally connected to the bottom frame;
   b) a mounting bracket connected to the sensor;
   c) a bottom front strut defining an upper end and a lower end, the bottom front strut being pivotally connected to the bottom frame at the upper end thereof, and pivotally connected to the mounting bracket at the lower end thereof; and
   d) a bottom rear strut defining an upper and a lower end, the bottom rear strut being spaced apart from the bottom front strut and substantially parallel thereto, the bottom rear strut being pivotally connected to the bottom frame at the upper end thereof and to the mounting bracket at the lower end thereof.

5. The apparatus of claim 4, further comprising a fine adjustment means for setting the sensing surface at the operating distance, the fine adjustment means is operatively connected to the lower frame and the mounting bracket.

6. The apparatus of claim 4, wherein the bottom struts, the lower frame, and the mounting bracket define four pivotable sides of a second parallelogram.

7. The apparatus of claim 6, wherein the upper frame is connected to a vehicle.

8. The apparatus of claim 7, wherein the vehicle is a trailer.

9. The apparatus of claim 7, further comprising a second apparatus substantially identical to the apparatus, an upper frame of the second apparatus being connected to the vehicle.

10. The apparatus of claim 1, further comprising a counterweight operatively connected to one of the front strut and the rear strut, wherein the counterweight is adapted to urge the sensing surface towards the operational distance.

11. The apparatus of claim 1, wherein the deflector comprises a wheel, and wherein the deflection surface is defined by an outer surface of the wheel.

12. The apparatus of claim 1, wherein the deflection surface is in contact with the target surface when in a deployed position, and wherein the deflection surface is at the operational distance below the sensing surface.

13. An apparatus for transporting a sensor having a sensing surface at an operational distance from a target surface, the apparatus comprising:
   a) an upper frame;
   b) a front strut defining an upper end and a lower end, the upper end of the front strut being pivotally connected to the upper frame, the lower end of the front strut being pivotally connected to the sensor;
   c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor;
   d) a lever operably connected to the upper frame, the lever being adapted to pivot the front and rear struts between a deployed position where the sensing surface is located at the operational distance from the target surface, and a stored position where the sensing surface is located at a stored distance, the stored distance being greater than the operational distance; and
   e) an actuator operably connected to the lever, the actuator adapted to move the lever between the deployed and stored positions.

14. The apparatus of claim 13, wherein the lever is adapted to resist the struts from lowering the sensing surface below the operational distance in the deployed position and the stored distance in the stored position.

15. The apparatus of claim 13, wherein the actuator is adapted to adjust the position of the lever in the deployed position, thereby providing a coarse adjustment for setting the sensing surface at the operational distance.

16. An apparatus for transporting a sensor comprising:
   a) an upper frame;
   b) a front strut defining an upper end and a lower end, the upper end of the front strut being pivotally connected to the upper frame, the lower end of the front strut being pivotally connected to the sensor;
   c) a rear strut defining an upper and a lower end, the rear strut being spaced apart from the front strut and substantially parallel thereto, the upper end of the rear strut being pivotally connected to the upper frame, the lower end of the rear strut being pivotally connected to the sensor;
   d) a cushioning bracket pivotally connected to the sensor at a bottom end thereof, the cushioning bracket defining a longitudinal guide slot therein, and
   e) a bar connected to the upper frame in transverse relation to the slot, the bar being slidingly secured within the slot, wherein the cushioning bracket slides along the bar upon movement of the sensor.

17. The apparatus of claim 16, wherein the cushioning bracket further comprises a cushioning means for cushioning the sensor during downward movement, the cushioning means being located in an upper end of the cushioning bracket.

18. The apparatus of claim 17, wherein the cushioning means comprises a piston adapted to engage the bar to resist downward movement of the cushioning bracket, thereby slowing downward movement of the sensor and the piston is adapted to resist a bottom range of the downward movement of the cushioning bracket.

19. The apparatus of claim 18 wherein the cushioning bracket is biased towards the bottom range of the downward movement of the cushioning bracket.

* * * * *